July 23, 1929.  A. HOLZHAUER, JR  1,721,663
HEATING ATTACHMENT FOR WINDSHIELDS
Filed March 12, 1928  3 Sheets-Sheet 1

Inventor
Alois Holzhauer, Jr.
By Brown, Jackson, Boettcher & Diemer
Atty's

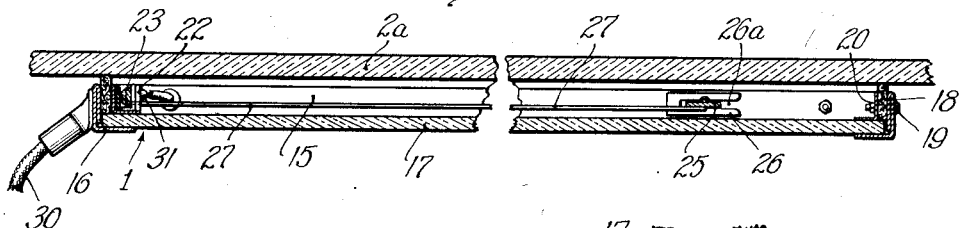
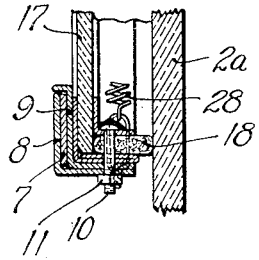
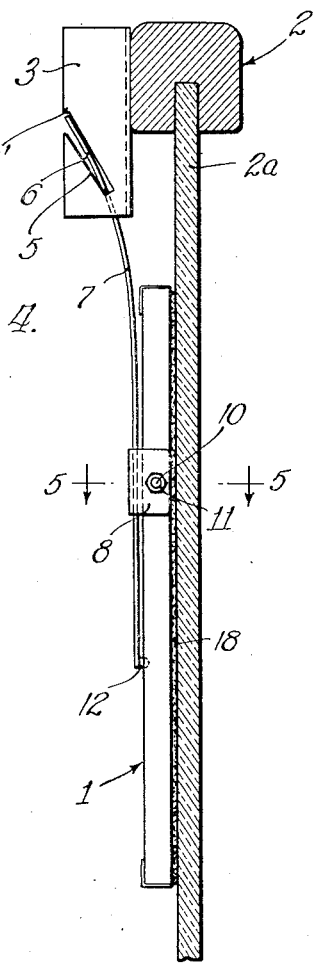
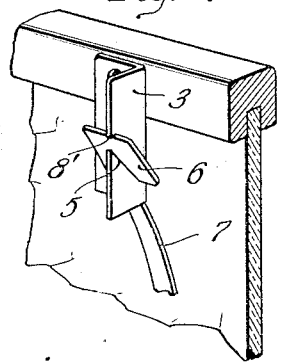
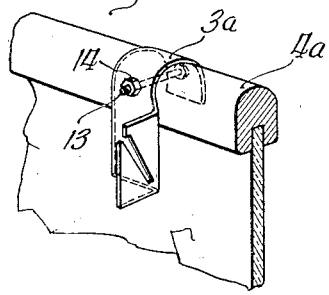

July 23, 1929.  A. HOLZHAUER, JR  1,721,663
HEATING ATTACHMENT FOR WINDSHIELDS
Filed March 12, 1928  3 Sheets-Sheet 3
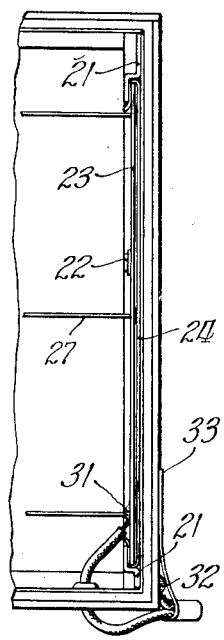
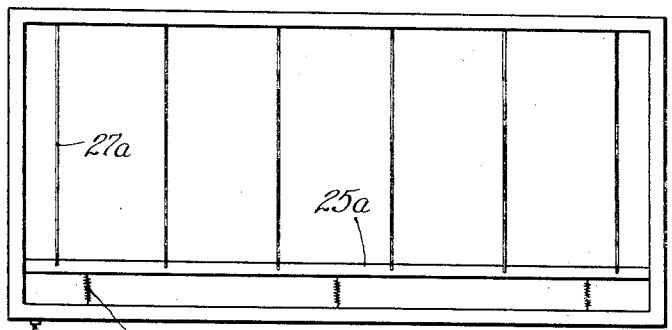
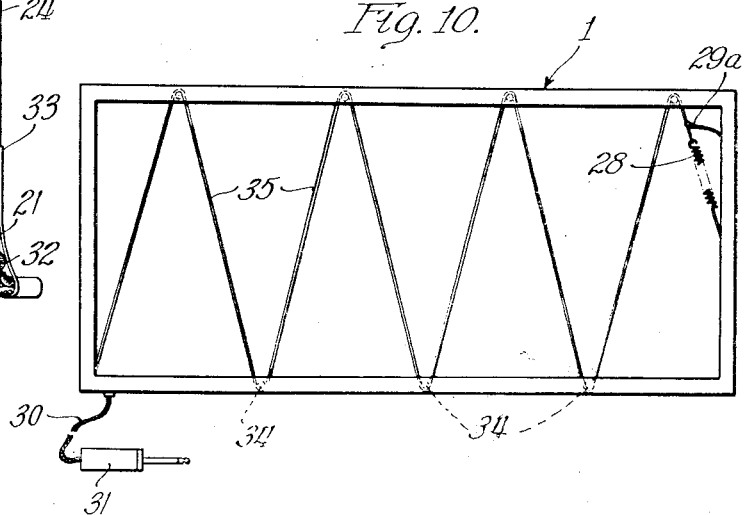

Patented July 23, 1929.

1,721,663

UNITED STATES PATENT OFFICE.

ALOIS HOLZHAUER, JR., OF MILWAUKEE, WISCONSIN.

HEATING ATTACHMENT FOR WINDSHIELDS.

Continuation of application Serial No. 234,059, filed November 18, 1927. This application filed March 12, 1928. Serial No. 261,165.

This invention relates to heating attachments for windshields.

One object of the present invention is the provision of a battery fed windshield heater attachment in which the parts are so combined and arranged as to effectively prevent and eliminate the formation of ice and snow on the windshield, or at least on that portion of the windshield within the normal line of vision, without imposing an excessive drain on the battery, and also without in itself impairing the driver's vision.

Another object is the provision in a windshield heater attachment of improved attaching means therefor which will permit ready application and removal of the attachment to and from the windshield, and which will normally maintain firm contact between the attachment and windshield to thereby prevent bumping and rattle, and otherwise increase the efficiency of the device.

Other objects and advantages of the present invention will appear from the following description of an illustrative embodiment of the present invention.

This application is a continuation of my copending application, Serial No. 234,059, filed November 18, 1927, the device herein disclosed being designed for the same purpose but including certain improvements not embodied in the device disclosed in said application.

In the drawings:

Fig. 3 is a section taken substantially on line 3—3 of Fig. 2;

Fig. 4 is a side view of the device as applied, the wind shield being shown fragmentarily and in section;

Fig. 5 is a section taken substantially on line 5—5 of Fig. 4;

Fig. 6 is an outer face view of the end portion of the heating device;

Fig. 7 is a fragmentary perspective view of the means for attaching the device to the windshield;

Fig. 8 is a fragmentary perspective view of a modified form of bracket for attaching the device to the windshield;

Fig. 9 is an inner face view of a modified form of heating device; and

Fig. 10 is an inner face view of a second modified form of heating device.

Figure 1:
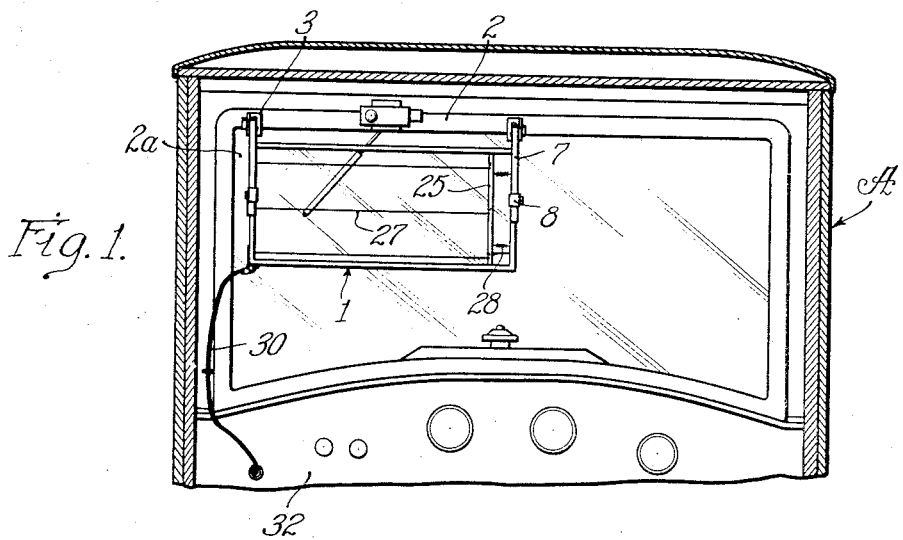
Fig. 1 is an inner face view of a heating device constructed in accordance with my invention as applied.

The heating attachment shown includes a rectangular sheet metal frame 1 which is open at its outer face and is adapted to be disposed adjacent the inner face of the glass 2$^a$ of a windshield 2 of known construction. Angle brackets 3 are suitably secured to top bar 4 of the windshield frame. Each of these brackets is provided with an inclined slot 5 for reception of a head 6 at the upper end of a flat resilient arm 7. A suitable lug 8′ depends from the bracket 3 across the upper edge of the head 6 and effectively prevents casual displacement of this head from the bracket. The arm 7 tapers upwardly in length and is secured to the sides of frame 1 by means of clamps comprising two members 8 and 9 which fit about the side of the frame and enclose the arm. These clamp members receive a screw stud 10 secured to the side of the frame, and a nut 11 threaded onto this stud serves to secure the clamp members to the frame and to force them toward each other into gripping contact with arm 7. In this manner the arms are secured to the ends of the casing and downward movement of the casing on the arm is prevented by the upward taper thereof. By loosening the nuts 11, the casing can be readily adjusted vertically upon the arm. Each arm is provided, at its lower end, with an integral offset finger 12 disposed to contact with clamp member 9 and prevent complete withdrawal of the arm from the clamp. When the casing is mounted upon the windshield in the manner described, the upper ends of the arms are bent away from the glass of the windshield thus placing the arms under tension so that the casing is pressed firmly against the windshield glass. In Fig. 8 of the drawings, I have illustrated a modified form of angle bracket 3ª which is similar to bracket 3, but is bent to fit about a rounded bar 4ª at the top of the windshield frame. This bracket is secured in position by a bolt 13 and a nut 14. Obviously, the bracket can be of any suitable shape or size to suit the particular construction of the windshield in connection with which the device is to be used.

As will be noted more clearly from Fig. 3, frame 1 comprises inner and outer members 15 and 16, respectively, these members being of angle cross section and formed of sheet metal. The inner side of the casing is closed by a sheet or pane of glass 17 confined between the members 15 and 16, and a strip of felt 18, or other suitable material, is clamped between the two frame members and projects beyond the outer side of the frame, this felt strip contacting with the inner face of the glass 2ª of the windshield to form a tight closure therewith. The members 15 and 16 are secured together in any suitable manner as by means of bolts 19 passing therethrough and nuts 20 threaded onto the bolts. It is to be noted that these bolts also provide an electrical connection between the inner and outer members of the frame.

Suitable clips 21 and 22 are secured to the inner frame member 15 at one side thereof in a suitable manner, as by being soldered thereto. A sheet metal connection bar 23 is confined between these clips and the adjacent side of the frame member, this bar being effectively insulated from the frame member by a strip 24 disposed about the bar 23 and between the bar and the clips.

A cross-bar 25 is disposed adjacent the other end of the frame. The ends of this bar fit into slots 26ª of guide members 26 soldered or otherwise suitably secured to the top and bottom elements of the inner frame member 15. The cross bar 25 is thus slidably supported for movement toward and away from the bar 23. The bars 23 and 25 are connected by resistance elements 27 suitably secured thereto, these elements being preferably formed of nicrome, though any other suitable resistance material may be employed. The bar 25 is urged toward the adjacent end of the frame by tension springs 28 secured thereto and to the frame. These springs act to maintain the resistance elements or wires 27 taut at all times while accommodating expansion and contraction thereof.

The cross-bar 25 is grounded to the frame by means of a short flexible lead 29. At the other end of the frame, I provide a double wire cord 30 having at one end a suitable plug 31 adapted to be inserted into a socket on instrument board 32 of the automobile A to the windshield of which the device is applied. One wire of the cord 30 is connected to the bar 23 at 31, and the other wire of this cord is grounded to the frame at 32 adjacent a supporting bracket 33 for the cord secured to the frame. In this manner, the heating elements or wires 27 can be quickly and easily connected in series into the electrical circuit of the automobile so as to be heated therefrom.

Figure 2:
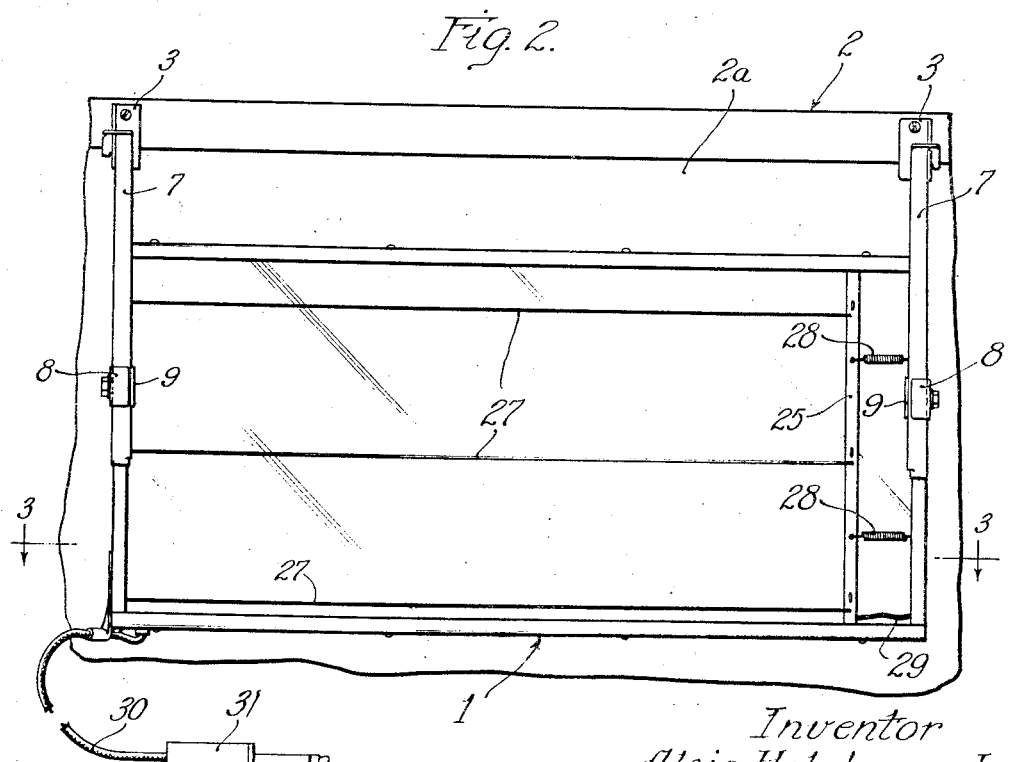
Fig. 2 is an inner face view of the device on an enlarged scale, the windshield being shown fragmentarily.

As will be noted more clearly from Figure 2, I provide three of the resistance elements 27, and these elements are so spaced as to distribute the heat therefrom substantially uniformly over the area of the portion of glass 2ª of the windshield within the outline of the casing. The heat radiated from the resistance elements 27 serves to very quickly heat the glass of the windshield so as to melt any snow or sleet on the outer face thereof, this heating action being greatly facilitated by the disposition of the heating elements closely adjacent the inner face of the windshield glass and by the uniform distribution of the heat radiated from such elements.

In Fig. 9 of the drawings, 1 have shown a modified form of my invention in which the resistance elements 27ª are disposed vertically and are spaced apart lengthwise of the casing, these elements being secured at their lower ends to a cross-bar 25ª which is urged downwardly by the springs 28.

In the modified form illustrated in Fig. 10, the resistance element is shown as a continuous length of wire which is secured at one end and is passed about a plurality of insulating pins 34, or similar elements, this resistance element being, in effect, arranged to provide a plurality of resistance elements 35 which are spaced apart transversely of the casing 1, the other end of the resistance element being connected by a tension spring 28 to the other side of the casing. This tension spring acts to maintain the resistance element taut at all times while accommodating expansion and contraction thereof. In this form of the device, the resistance element is grounded to the frame by a short flexible lead 29ª secured thereto. In all other respects the construction and operation of the modified form of the device of Fig. 10 is similar to that of the device of Figs. 1 to 6, inclusive.

What I claim is:—

1. In a heating device of the character described, a relatively thin and flat casing open at one side and adapted for attachment to a windshield, a cross bar slidably mounted within the casing, resistance elements secured to the bar at one end and to the casing at their other end, and yielding means urging the bar in a direction away from the resistance elements.

2. In a heating device of the character described, a relatively thin and flat casing open at one side and adapted for attachment to a windshield, resistance elements extending across the casing in spaced relation, and yielding means for maintaining said elements taut.

3. In a heating device of the character described, a relatively thin and flat casing open at one side and adapted for attachment to a windshield, holding clips secured to the inner face of the frame at one end thereof, a bar confined between said clips and the adjacent end of the frame, an insulating strip extending about the bar and electrically insulating it from the frame and the clips, a cross bar slidably mounted in the frame adjacent the other end thereof and grounded to the frame, resistance elements connecting the bars, tension springs connecting the cross bar and the adjacent end of the frame, and means for connecting the frame and the first mentioned bar into an electric circuit.

4. In a glass pane heater the combination of a relatively thin casing having an open side for application to a pane, a plurality of spaced resistor elements extending across the casing and exposed to the pane through said open side, and a transparent closure for the opposite side of said casing.

5. In a glass pane heater the combination of a relatively thin casing having an open side for application to a pane, a plurality of spaced resistor elements extending across the casing and exposed to the pane though said open side, resilient means for maintaining said elements taut, and a transparent closure for the opposite side of said casing.

6. In a windshield heater for motor vehicles the combination of a plurality of resistor elements, means for supporting said elements adjacent the windshield and directly exposed thereto, said elements being so shaped as to avoid impairing visibility, and means including a transparent cover plate behind said elements for cooperation with the windshield to confine the heat generated by said elements.

7. In a windshield heater for motor vehicles the combination of an electrical resistor element, means for supporting said element adjacent the windshield and directly exposed thereto, said element being so shaped as to avoid impairing visibility, and means including a transparent cover plate behind said element for cooperation with the windshield to confine the heat generated by said element.

8. In combination, a windshield, a casing open at one side, means detachably securing the casing to the windshield with its open side adjacent the glass of the windshield, said means including transversely resilient suspension means under tension to maintain said casing against said windshield, and heating means within the casing.

9. In combination, a windshield, a casing open at one side and disposed with its open side adjacent the glass of the windshield, transversely resilient arms extending from the casing, means for detachably securing the arms to the windshield and for maintaining the arms under transverse tension to thereby urge the casing toward the windshield, and heating means within the casing.

10. In combination, a windshield, a casing in thermal communication with the windshield and disposed adjacent one face of the glass thereof, transversely resilient arms extending from the casing, means for detachably securing the arms to the windshield and for maintaining them under transverse tension to thereby urge the casing toward the windshield, and heating means within the casing.

11. In combination, a windshield, a casing in thermal communication with the windshield and disposed adjacent one face of the glass thereof, transversely resilient arms extending from the casing, supporting brackets therefor, said brackets and the arms having cooperating means for detachably securing the arms to the brackets and for establishing a transverse tension in said arms to thereby urge the casing toward the windshield, and heating means within the casing.

12. In combination, a windshield, a casing in thermal communication with the windshield and disposed adjacent one face of the glass thereof, fixed brackets adjacent the windshield each having an inclined slot, angularly disposed fingers rigid with the arms and engaging into said slots for supporting the casing from the brackets, the slots and the fingers being disposed to establish and maintain a transverse tension in the arms to thereby urge the casing toward the windshield, and heating means within the casing.

13. In combination, a windshield, a casing in thermal communication with the windshield and disposed adjacent one face of the glass thereof, brackets fixedly mounted adjacent the top of the glass of the windshield, each bracket having a slot inclined downwardly toward the windshield glass, and resilient arms extending from the casing and provided at their upper ends with flat fingers of appreciable breadth engaging into said slots and coacting with the brackets for maintaining the arms under transverse tension and urging the casing toward the windshield, and heating means within the casing.

14. In combination, a windshield, a casing in thermal communication with the windshield and disposed adjacent one face of the glass thereof, fixed brackets adjacent the windshield each having an inclined slot, angularly disposed fingers rigid with the arms and engaging into said slots for supporting the casing from the brackets, the slots and the fingers being disposed to maintain the arms under tension for urging the casing toward the windshield, and heating means within the casing, each bracket having an element disposed to engage the outer edge of the respective fingers to prevent casual displacement thereof.

15. As a new article of manufacture, a device for heating windshields, said device including, a relatively thin and flat casing, heating means within the casing, and resilient supporting arms carried by the casing for mounting and pressing said casing against the windshield.

16. A heater for windshields or the like comprising a relatively thin casing having an open side, a transparent closure for the opposite side thereof, a transversely resilient support for said casing, a supporting bracket coacting with said support to produce a transverse tension therein by which said frame is pressed against the surface to be heated, and means for heating the air in said casing.

In witness whereof, I hereunto subscribe my name this 9th day of March, 1928.

ALOIS HOLZHAUER, JR.

DISCLAIMER 1,721,663.—*Alois Holzhauer, Jr.*, Milwaukee, Wis. HEATING ATTACHMENT FOR WINDSHIELDS. Patent dated July 23, 1929. Disclaimer filed December 11, 1933, by the assignee, *Holzhauer Products Corporation*, and the patentee.

Your petitioners, therefore, disclaim claim 2 of said patent, No. 1,721,663, said claim being in the following words:

"In a heating device of the character described, a relatively thin and flat casing open at one side and adapted for attachment to a windshield, resistance elements extending across the casing in spaced relation, and yielding means for maintaining said elements taut."

Your petitioners further disclaim from the scope of meaning of said claims numbered 4 and 5 of said patent, No. 1,721,663, any and all forms of "pane heater" except those wherein the "resistor elements" are "spaced" from the "pane" and laterally from one another, thereby to avoid direct contact thereof with the "pane" and to spread the heat therefrom through the thin layer of air confined by the "casing" against the "pane", whereby a portion of the "pane" is heated substantially uniformly and indirectly by the layer of air thus confined.

Your petitioners also further disclaim from the scope of meaning of said claims numbered 6 and 7 of said patent, No. 1,721,663, any and all forms of "windshield heater" except those wherein the heat confining "means" last recited in each of said claims includes a peripheral frame of angular cross section surrounding and supporting the periphery of the "transparent cover plate", a flexible strip projecting laterally from the periphery of said "transparent cover plate" beyond said frame for contact with the "windshield", together with means for securing both said "transparent cover plate" and said strip to said frame.

[*Official Gazette January 2, 1934.*]